United States Patent
Ren et al.

(10) Patent No.: US 12,067,279 B2
(45) Date of Patent: Aug. 20, 2024

(54) METADATA STORAGE METHOD AND DEVICE

(71) Applicant: HUAWEI TECHNOLOGIES CO., LTD., Guangdong (CN)

(72) Inventors: Ren Ren, Shanghai (CN); Chen Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/978,838

(22) Filed: Nov. 1, 2022

(65) Prior Publication Data

US 2023/0063305 A1  Mar. 2, 2023

Related U.S. Application Data

(63) Continuation of application No. PCT/CN2021/091294, filed on Apr. 30, 2021.

(30) Foreign Application Priority Data

May 6, 2020 (CN) .......................... 202010374530.8
Jun. 30, 2020 (CN) .......................... 202010615013.5

(51) Int. Cl.
*G06F 3/00* (2006.01)
*G06F 3/06* (2006.01)

(52) U.S. Cl.
CPC .......... *G06F 3/0652* (2013.01); *G06F 3/0604* (2013.01); *G06F 3/0629* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 10,503,697 B1 | 12/2019 | Singh et al. | |
| 2013/0262601 A1* | 10/2013 | Bao ...................... | H04L 51/216 709/206 |
| 2018/0364949 A1 | 12/2018 | Aston et al. | |

(Continued)

FOREIGN PATENT DOCUMENTS

| | | |
|---|---|---|
| CN | 101655818 A | 2/2010 |
| CN | 101996217 A | 3/2011 |

(Continued)

OTHER PUBLICATIONS

YAN Fang et al., "Metadata Layout for De-Duplication System", Transactions of Beijin Institute of Technology, vol. 34, No. 5, May 2014, with an English abstract, total 6 pages.

*Primary Examiner* — Midys Rojas

(74) *Attorney, Agent, or Firm* — HUAWEI TECHNOLOGIES CO., LTD.

(57) ABSTRACT

In a method for storing index metadata associated with stored data, a storage device provides a first metadata storage unit and a second metadata storage unit, wherein a size of the first metadata storage unit is greater than a size of the second metadata storage unit. When a size of target data reaches a specified threshold, the storage device stores index metadata of the target data based on the first metadata storage unit. When the size of the target data is less than the specified threshold, the storage device stores the index metadata of the target data based on the second metadata storage unit.

12 Claims, 9 Drawing Sheets

(56) References Cited

U.S. PATENT DOCUMENTS

| | | |
|---|---|---|
| 2019/0079859 A1 | 3/2019 | Li et al. |
| 2019/0187902 A1 | 6/2019 | Lee |
| 2020/0004852 A1 | 1/2020 | Qiu et al. |
| 2020/0012619 A1 | 1/2020 | Gupta et al. |
| 2020/0125450 A1 | 4/2020 | Aron et al. |
| 2022/0335340 A1* | 10/2022 | Moustafa ............ G06F 11/3003 |

FOREIGN PATENT DOCUMENTS

| | | |
|---|---|---|
| CN | 106294603 A | 1/2017 |
| CN | 109508143 A | 3/2019 |
| CN | 109726145 A | 5/2019 |
| CN | 110069215 A | 7/2019 |
| CN | 110750211 A | 2/2020 |
| CN | 110764706 A | 2/2020 |
| JP | 2010204970 A | 9/2010 |
| JP | 2015194973 A | 11/2015 |

* cited by examiner

METADATA STORAGE METHOD AND DEVICE

CROSS-REFERENCE TO RELATED APPLICATIONS

This application is a continuation of International Application PCT/CN2021/091294, filed on Apr. 30, 2021, which claims priority to Chinese Patent Application No. 202010615013.5, filed on Jun. 30, 2020, and Chinese Patent Application No. 202010374530.8, filed on May 6, 2020. The aforementioned priority applications are hereby incorporated by reference in their entirety.

TECHNICAL FIELD

Embodiments of this application relate to the field of computer technologies, and specifically, to a metadata storage method and device.

BACKGROUND

Performance and costs are key indicators pursued by a storage system. To provide rich storage features, an index relationship is established during data storage. The index relationship is used to manage a mapping relationship between users' logical data space and physical data space of an underlying storage pool or storage disk.

During mapping relationship establishment, the physical data space is divided into several fixed-size units, and the unit is also referred to as a granularity. Mapping from a logical address to a physical address of each granularity is also referred to as index metadata in the storage system.

In an existing storage system, when a large amount of data needs to be read in a same time period, a server splits the large amount of data that needs to be read into a plurality of pieces of data of a fixed-size granularity for query or read. Correspondingly, a plurality of pieces of index metadata are generated. A large amount of index metadata consumes excessive storage resources, affecting data query or read efficiency.

SUMMARY

Embodiments of this application provide a metadata storage method and device. Therefore, during metadata access, metadata of target data is stored in a corresponding metadata storage unit based on a size of the target data, and the target data does not need to be split into a plurality of pieces of metadata for storage. This saves storage resources.

A first aspect of embodiments of this application provides a metadata storage method. The method includes:

The storage device provides a first metadata storage unit and a second metadata storage unit. A size of the first metadata storage unit is greater than a size of the second metadata storage unit. Correspondingly, the size may be a data granularity.

When a size of target data reaches a specified threshold, the storage device stores metadata of the target data in the first metadata storage unit. The target data indicates data that needs to be stored in the storage device.

Alternatively, when the size of the target data is less than the specified threshold, the storage device stores the metadata of the target data in the second metadata storage unit.

In this embodiment of this application, the metadata of the target data is stored in a corresponding storage unit based on the size of the target data, and the target data does not need to be split into a plurality of pieces of metadata for storage. This saves storage resources.

Optionally, in a possible implementation, the storage device sets a maximum value and a minimum value of a size of a metadata storage unit. The size of the first metadata storage unit is between the minimum value and the maximum value, and the size of the second metadata storage unit is also between the minimum value and the maximum value.

In this embodiment of this application, the maximum value and the minimum value of the size of the metadata storage unit are set. This improves solution realizability.

Optionally, in a possible implementation, when the target data is stored for the first time, the size of the target data is less than the specified threshold. Then, the target data is updated, and the size of the target data is correspondingly updated to be greater than the specified threshold. In this case, the storage device deletes the metadata of the target data in the second data storage unit, and stores metadata of updated target data in the first metadata storage unit.

In this embodiment of this application, when the size of the target data increases, the metadata of the target data is stored in the first metadata storage unit with a larger size. This improves metadata storage flexibility.

Optionally, in a possible implementation, when the target data is stored for the first time, the size of the target data is greater than the specified threshold. Then, the target data is updated, and the size of the target data is correspondingly updated to be less than the specified threshold. In this case, the storage device deletes difference metadata of the metadata of the target data in the first data storage unit. The difference metadata indicates a difference between metadata of updated target data and the metadata of the target data. In addition, the storage device stores the difference metadata in the second metadata storage unit.

In this embodiment of this application, when the size of the target data decreases, the difference metadata of the metadata of the target data is stored in the second metadata storage unit, and different metadata is managed by category. This improves metadata storage flexibility.

Optionally, in a possible implementation, when there are a plurality of second metadata storage units in the storage device, the plurality of second metadata storage units respectively store metadata of different target data, and a superimposed size of the plurality of second metadata storage units is less than or equal to the size of the first metadata storage unit, the storage device deletes the metadata in the plurality of second metadata storage units, and stores the metadata of the different target data in the first metadata storage unit.

In this embodiment of this application, when a plurality of storage units respectively store metadata of pieces of target data with relatively small sizes, the metadata of the pieces of target data with relatively small sizes may be combined into a large metadata storage unit. This improves metadata storage flexibility and saves metadata storage resources.

A second aspect of embodiments of this application provides a storage device. The storage device includes:

a first metadata storage unit and a second metadata storage unit, where a size of the first metadata storage unit is greater than a size of the second metadata storage unit; and a processing unit, configured to: when a size of target data reaches a specified threshold, store metadata of the target data based on the first metadata storage unit; or when the size of the target data is less than the specified threshold, store the metadata of the target data based on the second metadata storage unit.

Optionally, the storage device further includes:

a setting unit, configured to set a maximum value and a minimum value of a size of a metadata storage unit, where the size of the first metadata storage unit is between the minimum value and the maximum value, and the size of the second metadata storage unit is between the minimum value and the maximum value.

Optionally, when the size of the target data is less than the specified threshold, the storage device further includes a deletion unit.

The deletion unit is configured to: when the size of the target data is updated to be greater than the specified threshold, delete the metadata of the target data in the second data storage unit.

The processing unit is further configured to store metadata of updated target data in the first metadata storage unit.

Optionally, when the size of the target data is greater than the specified threshold, the storage device further includes a deletion unit.

The deletion unit is further configured to: when the size of the target data is updated to be less than the specified threshold, delete difference metadata of the metadata of the target data in the first data storage unit. The difference metadata indicates a difference between metadata of updated target data and the metadata of the target data.

The processing unit is further configured to store the difference metadata in the second metadata storage unit.

Optionally, when there are a plurality of second metadata storage units, the plurality of second metadata storage units respectively store metadata of different target data, and a superimposed size of the plurality of second metadata storage units is less than or equal to the size of the first metadata storage unit, the deletion unit is further configured to delete the metadata in the plurality of second metadata storage units.

The processing unit is further configured to store the metadata of the different target data in the first metadata storage unit.

A third aspect of embodiments of this application provides a storage system. The storage system includes:

a first metadata storage unit, configured to perform the steps performed by the first metadata storage unit in the implementations of the first aspect of this application; and a second metadata storage unit, configured to perform the steps performed by the second metadata storage unit in the implementations of the first aspect of this application.

A fourth aspect of embodiments of this application provides a storage device. The storage device includes:

a processor, a memory, and an input/output interface, where the processor and the memory are connected to the input/output interface; the memory is configured to store program code; and the processor invokes the program code in the memory, to perform the method provided in the implementations of the first aspect of this application.

A fifth aspect of embodiments of this application provides a storage medium. It should be noted that the technical solutions of the present invention essentially, or a part contributing to the conventional technology, or all or a part of the technical solutions may be implemented in a form of a software product. The computer software product is stored in a storage medium, and is configured to store computer software instructions used by the foregoing device. The computer software product includes a program designed for performing the metadata storage method in the first aspect.

The storage medium includes any medium that can store program code, such as a USB flash drive, a removable hard disk, a read-only memory (ROM, Read-Only Memory), a random access memory (RAM, Random Access Memory), a magnetic disk, or an optical disc.

A sixth aspect of embodiments of this application provides a computer program product including instructions. When the computer program product runs on a computer, the computer is enabled to perform the method in the implementations of the first aspect of this application.

The foregoing processor may be a general-purpose central processing unit (Central Processing Unit, CPU), a microprocessor, an application-specific integrated circuit (application-specific integrated circuit, ASIC), or one or more integrated circuits configured to control program execution of the metadata storage method in the first aspect.

It can be learned from the foregoing technical solutions that embodiments of this application have the following advantage:

In embodiments of this application, the metadata of the target data is stored in a corresponding storage unit based on the size of the target data, and the target data does not need to be split into a plurality of pieces of metadata for storage. This saves storage resources.

DESCRIPTION OF EMBODIMENTS

Embodiments of this application provide a data storage method and device. Therefore, during data access, a corresponding first index node is generated based on first data, and a data granularity of the first index node is greater than a minimum data granularity, so that a plurality of index nodes corresponding to the minimum granularity do not need to be generated correspondingly. This saves storage resources and improves data read/write efficiency.

Figure 1:
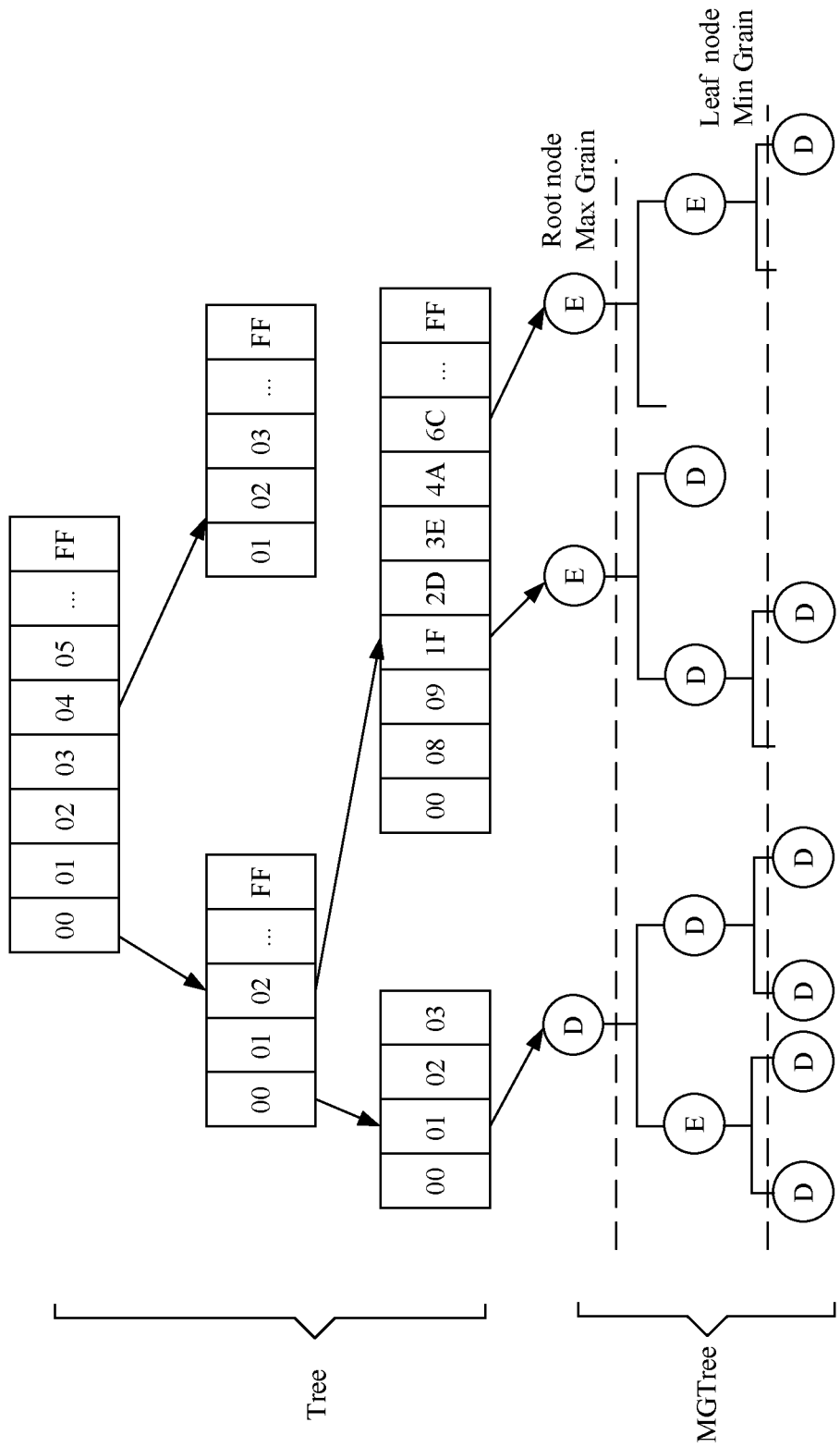
FIG. 1 is a schematic diagram of a framework of a metadata storage system according to an embodiment of this application.

FIG. 1 is a schematic diagram of a framework of a metadata storage system according to an embodiment of this application.

An embodiment of this application provides a metadata storage index framework. The data storage index framework includes a plurality of index nodes, and correspondences between different index nodes constitute an index tree framework. For MGTree in the figure, a root index node corresponds to a maximum data granularity, one root index node corresponds to a plurality of sub index nodes, and different sub index nodes correspond to further sub index nodes. Index nodes at a same layer may correspond to different data granularities, or may correspond to a same data granularity. This is not specifically limited in this embodiment of this application. In a correspondence between an upper-layer index node and a lower-layer index node, a data granularity corresponding to the lower-layer index node is less than a data granularity corresponding to the upper-layer index node, in other words, the lower-layer index node is attached to the upper-layer index node.

In a possible implementation, a bottom-layer index node corresponds to a minimum data granularity, and the minimum data granularity is preset in the storage system. A top-layer index node may be named Max Grain, indicating an index node corresponding to the maximum data granularity. In other words, the top-layer index node corresponds to a maximum value of a size of a metadata storage unit. The bottom-layer index node may be named Min Grain, indicating an index node corresponding to the minimum data granularity. In other words, the bottom-layer index node corresponds to a minimum value of a size of a metadata storage unit.

It should be noted that MGTree may be independently set in the index storage system, or may be grafted onto an existing index storage system. For example, MGTree may be grafted onto ARTree. More specifically, a root index node in MGTree corresponds to a bottom-layer index node in ARTree. For ARTree, an original function of indexing a fixed data block is changed to a function of indexing a root index node in MGTree. One MGTree sub index instance as a whole corresponds to one record of an ARTree primary index, and still describes a fixed-size data granularity, but a size of the data granularity may be set correspondingly, for example, 1 MB or 2 MB. It may be understood that, during actual application, MGTree may alternatively be grafted onto another index storage system, for example, a B+tree index storage system. This is not specifically limited herein.

The index storage framework may be applied to a storage device, for example, a storage server or a terminal device having a storage function. This is not specifically limited herein.

During actual application, the storage device may include at least one first metadata storage unit and at least one second metadata storage unit. A size of a metadata storage unit indicates a data granularity. The metadata storage unit stores metadata of target data, and the metadata indicates index information stored in an index node. Therefore, the storage unit corresponds to the index node.

The following describes data storage methods in embodiments of this application with reference to the storage system framework in FIG. 1.

In embodiments of this application, there are two manners of writing index information corresponding to data into a storage device. One manner is an overlapping mode. To be specific, when index information corresponding to duplicate data is written, corresponding index nodes are established in a write sequence, and existing index information in a previous index node is not modified. In this way, when data is written, related index information can be quickly written. This improves data write efficiency. The other manner is a linear mode. To be specific, when index information corresponding to duplicate data is written, existing index information in a previous index node is modified first, then a corresponding sub index node of currently modified data is established, and index information of the currently modified data is stored in the newly established sub index node. In the linear mode, during data read, corresponding data can be directly read based on index information without re-determining whether index information is repeated. This improves data read efficiency. Specifically, embodiments of this application separately describe the two different index information establishment manners.

1. Overlapping Mode

Figure 2:
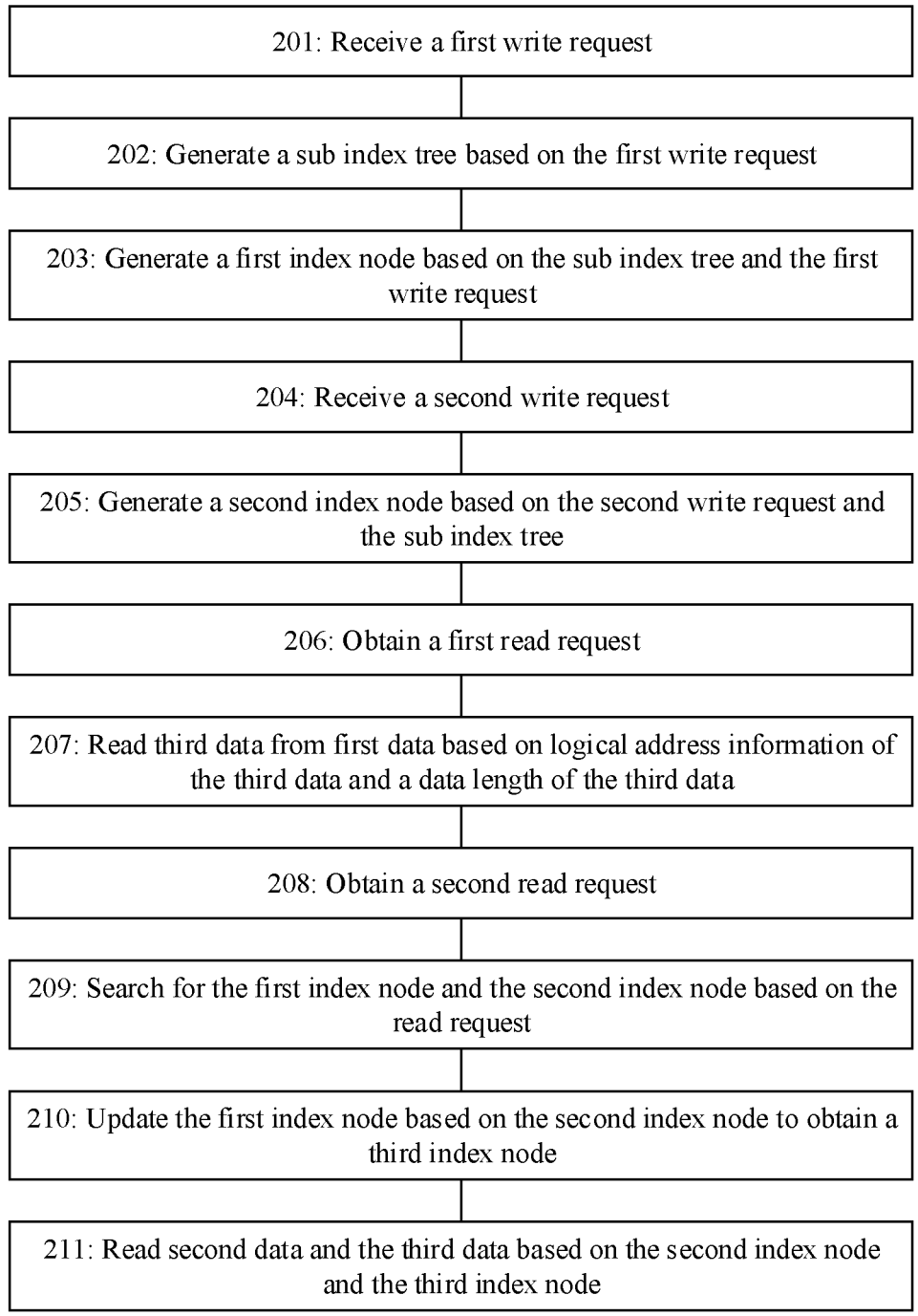
FIG. 2 is a schematic flowchart of a metadata storage method according to an embodiment of this application.

FIG. 2 is a schematic flowchart of a data storage method according to an embodiment of this application.

In step 201, a storage device receives a first write request.

When a terminal device or another network device needs to write data into the storage device, the storage device receives a first write request. The first write request is used to write first data. In other words, the first data is target data.

Specifically, in a possible implementation, the first write request includes a data length and related information of the to-be-written first data. The storage device allocates a storage address based on the data length and the related information of the first data that are included in the first write request.

This embodiment of this application is applied to a plurality of scenarios. For example, in a bandwidth scenario, the terminal device or the another network device writes a large amount of data in a unit time, for example, writes 256 kb or 1 mb data in 1 ms. In this case, a size of data that the first write request requires to write is 256 kb or 1 mb.

In step 202, the storage device generates a sub index tree based on the first write request.

After obtaining the first write request, the storage device generates the sub index tree based on the related information carried in the first write request. The sub index tree is a sub index tree in a primary index tree. The primary index tree is used to query data stored by the storage device.

Specifically, the primary index tree is a main index framework in the storage device. After obtaining the data length and the related information of the to-be-written first data in the first write request, the storage device allocates the corresponding address into which the first data needs to be written. The storage device searches the primary index tree based on the corresponding address to find a corresponding index node in the primary index tree, and generates the sub index tree of the index node. The sub index tree includes at least a root node, and the root node is MaxGrain.

It should be noted that data granularities of root nodes in different sub index trees may be different or may be the same. This is specifically set as required during actual application, and is not specifically limited herein.

During actual application, when a data granularity of the first data that the first write request requests to write is greater than a preset data granularity of a root node in a sub index tree, a plurality of sub index trees are separately established in the primary index tree, the first data is decomposed into a plurality of pieces of data of a size of a data granularity of the root node, and then the decomposed first data is correspondingly stored in different sub index trees.

In step 203, the storage device generates a first index node based on the sub index tree and the first write request.

After generating the sub index tree, the storage device generates the first index node based on the sub index tree and the related information in the first write request. The first index node is a child node in the sub index tree. The first index node records index information of the first data. The index information of the first data is used to query the first data.

Specifically, after generating the sub index tree, the storage device determines, based on the data length of the first data, whether to record the index information of the first data in the root node in the sub index tree. In other words, when a size of the target data reaches a specified threshold, metadata of the target data is stored based on a first metadata storage unit. In this case, the first metadata storage unit is the root node. When the data length of the first data is equal to a MaxGrain data granularity, the storage device records the index information of the first data in the root node, in other words, the root node is the first index node. When the data length of the first data is less than the MaxGrain data granularity, in other words, when the size of the target data is less than the specified threshold, the metadata of the target data is stored based on a second metadata storage unit. In this case, the second metadata storage unit is a sub index node below the root node. A sub index node is generated below the root node, and the index information of the first data is recorded in the sub index node. In this case, the sub index node is the first index node.

Preferably, in a possible implementation, when the data length of the first data is greater than a half of the data granularity of the root node and less than the data granularity of the root node, the storage device records the index information of the first data in the root node in the sub index tree. When the data length of the first data is less than or equal to the half of the data granularity of the root node, the storage device generates a new sub index node below the root index node, and records the index information of the first data in the new sub index node.

It should be noted that the storage device generates corresponding index information based on the data length of the first data and stores the index information in a corresponding index node, without a need of splitting the first data into several pieces of data of a minimum data granularity and correspondingly generating index information of the minimum data granularity. This saves storage resources used by the storage device to store index information.

For example, when the first write request requests to write 2 MB data, the storage device generates a sub index tree of a corresponding index node in an index tree, and records index information of the data in a root node. In other words, a data granularity corresponding to the root node is 2 MB.

In step 204, the storage device receives a second write request.

After storing the index information of the first write request, the storage device receives the second write request. The second write request is used to write second data. A logical address into which the second data is written belongs to a logical address range of the sub index tree in which the index information of the first data is located.

In step 205, the storage device generates a second index node based on the second write request and the sub index tree.

After receiving the second write request, the storage device generates the second index node based on the second write request and the sub index tree. Index information in the second index node is used to query the second data.

Figure 3:
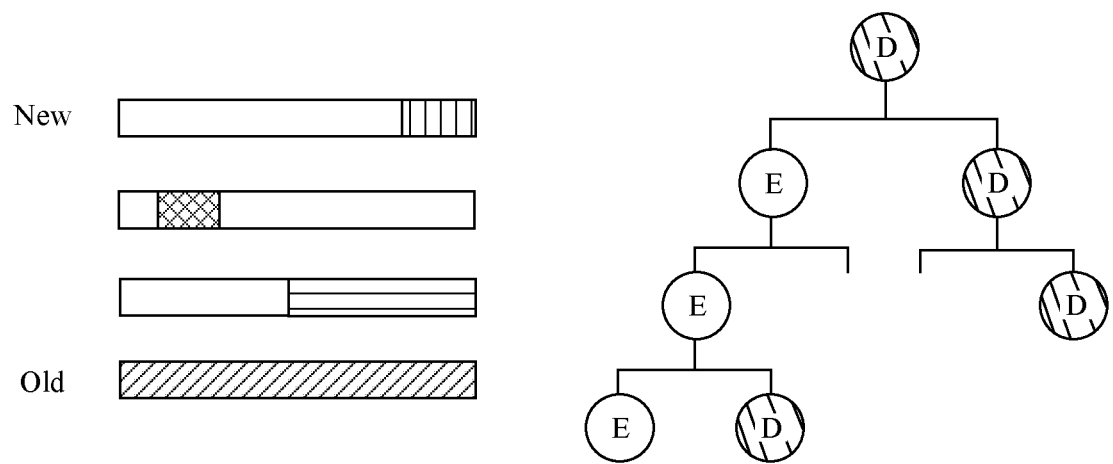
FIG. 3 is a schematic diagram of a scenario of a metadata storage method according to an embodiment of this application.

In a possible implementation, when the second data is data obtained by modifying the first data, and a data length of the second data is less than the data length of the first data, the storage device generates the second index node based on related information carried in the second write request, the index information recorded in the sub index tree, and the first index node. The second index node is a child node of the first index node. As shown in FIG. 3, for left bars in FIG. 3 in a direction from Old to New, a bottom-layer bar indicates index information corresponding to first data that is first written, and a top-layer bar indicates index information corresponding to data that is last written and that is obtained by modifying the first data. The bars from the bottom to the top sequentially indicate index information corresponding to data obtained by modifying the first data based on different write requests. Different grid bars indicate different index information corresponding to different data obtained through modification. In a right dendrogram in FIG. 3, a top-layer node is a root node, and nodes below the root node are sub index nodes in the sub index tree.

Specifically, in a possible implementation, logical address information of the second data carried in the second write request indicates to write the second data into the sub index tree in which the first data is located. In addition, the data length of the second data is less than the data length of the first data. In other words, it indicates that the second data is data obtained by modifying the first data. The storage device establishes a new index node, that is, the second index node, below the first index node corresponding to the first data, and stores index information corresponding to the second data in the second index node. During actual application, the first data is the target data, the second data is updated target data, the specified threshold is the data granularity corresponding to the first data, and difference metadata indicates index information corresponding to data obtained by modifying the first data. In this case, if a size of the updated target data is less than the specified threshold, the difference metadata is stored in the second metadata storage unit, and the second metadata storage unit is the second index node.

In a possible implementation, when the data length of the second data is greater than or equal to the data length of the first data, it indicates that the second data covers the first data. The storage device determines, by using the logical address information of the second data and the found sub index tree corresponding to the logical address information of the second data, that the second data is data obtained by modifying the first data. After finding the corresponding first index node, the storage device deletes the first index node.

When the data length of the second data is equal to the data length of the first data, the storage device generates the second index node at the same location as the first index node, or the storage device generates the second index node at a location parallel to the first index node. This is not specifically limited herein.

When the data length of the second data is greater than the data length of the first data, the storage device generates the second index node at a location of a parent node of the first index node. In a possible implementation, a location at which the second index node is generated may be determined based on the data length of the second data. For example, starting from the root node, each time the sub index tree goes down by one layer, it indicates that a data granularity is decreased by half, and a layer height of the sub index tree is $\log_2$ (Maximum data granularity/Minimum data granularity). When the data length of the first data is one quarter of the data granularity of the root node, the index node corresponding to the first data is located at a layer lower than that of the root node by two layers. When the data length of the second data is greater than the data length of the first data and less than twice the data length of the first data, a second sub index node is generated at the second layer of the sub index tree, that is, a location of a parent node of a first sub index node. When the data length of the second data is greater than twice the data length of the first data, the index information of the second data is written into the root node. In this case, the second sub index node is the root node. During actual application, the first data is the target data, the second data is the updated target data, the specified threshold is the data granularity corresponding to the first data, the first metadata storage unit is a root node, and the second metadata storage unit is a sub index node. In this case, if the size of the updated target data is greater than the specified threshold, the metadata of the target data in the second metadata storage unit is deleted, and metadata of the updated target data is stored in the first metadata storage unit.

Figure 4A:
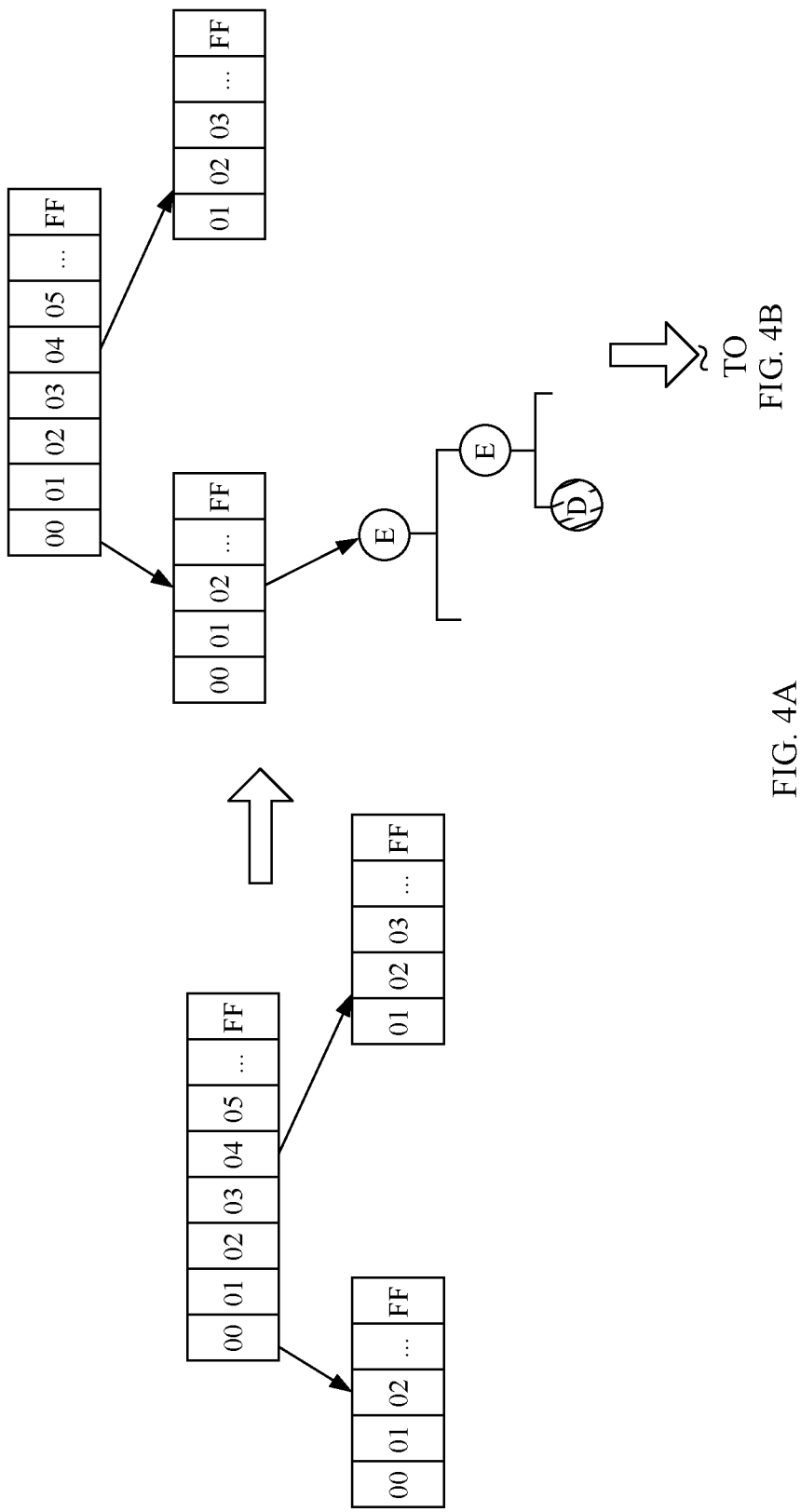
FIG. 4A and FIG. 4B are a schematic diagram of another scenario of a metadata storage method according to an embodiment of this application.
Figure 4B:
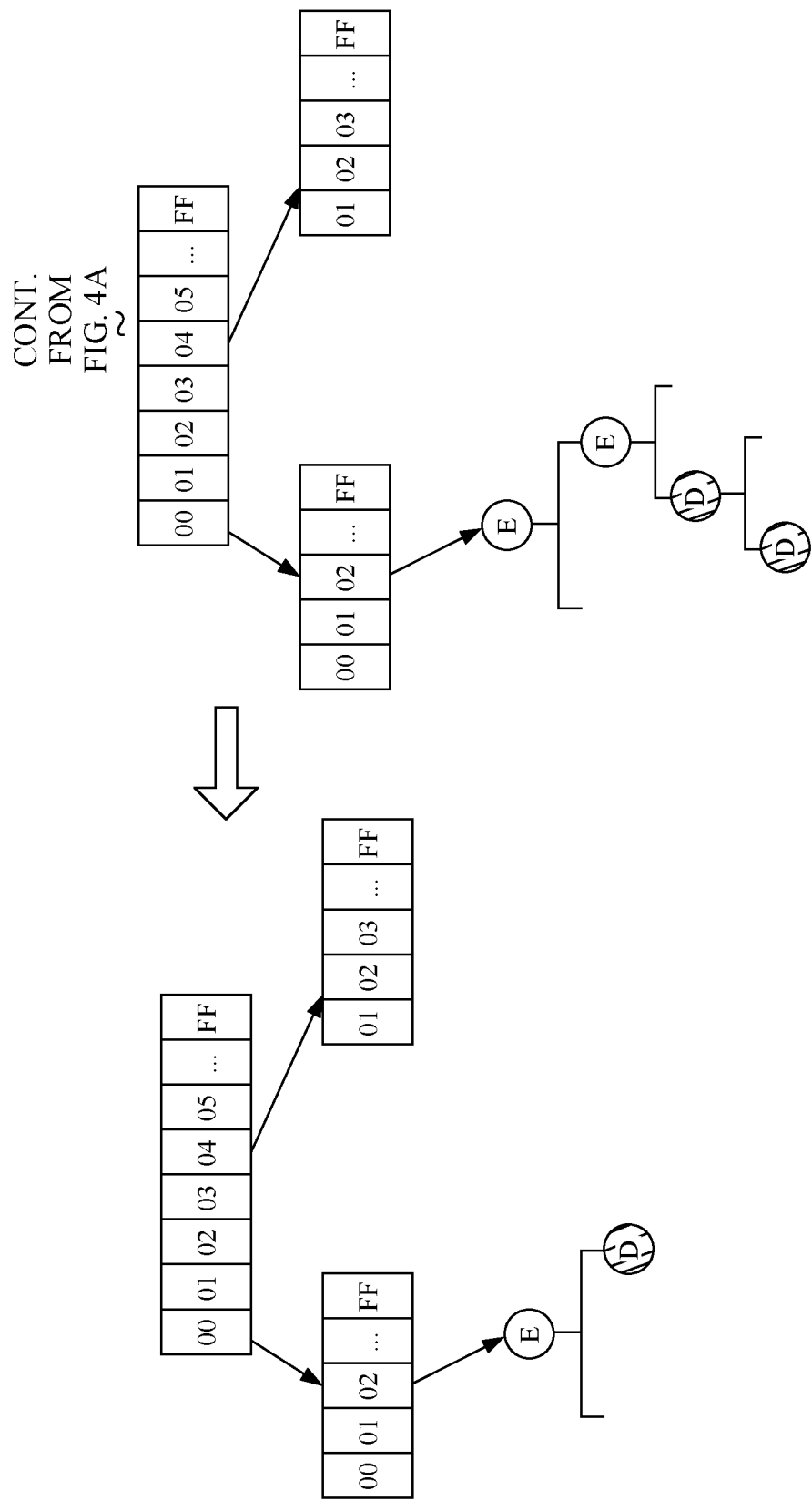

For example, FIG. 4A and FIG. 4B shows a procedure of writing index information corresponding to data in the overlapping mode. A left figure in FIG. 4A shows a structure of existing ARTree. A right figure in FIG. 4A indicates that, if one first write request is received, a corresponding sub index tree is generated above a bottom-layer index node in corresponding ARTree, and a first sub index node is generated at a layer lower than that of the root node by two layers. A right figure in FIG. 4B indicates that, if one second write request is received, and a data length of data that the second write request requests to write is less than a data length of data that a first write request requests to write, a sub index node is generated at a layer lower than that of a first index node. A left figure in FIG. 4B indicates that, if one second write request is received, and a data length of data that the second write request requests to write is greater than or equal to a data length of data that a first write request requests to write, a second index node is generated on a parent node based on the first write request, and a sub index node below the second index node is deleted.

Correspondingly, after generating the second sub index node, the storage device updates, based on the second write request, the first data stored in the storage device, to obtain third data.

In step 206, the storage device obtains a first read request.

The storage device obtains the first read request. The first read request is used to read fourth data. The fourth data belongs to the first data, and a data length of the fourth data is less than the data length of the first data. In other words, the fourth data is a part of the first data. The first read request carries logical address information of the fourth data and information about the data length of the fourth data.

In step 207, the storage device reads the fourth data from the first data based on the logical address information of the fourth data and the data length of the fourth data.

After obtaining the first read request, the storage device reads the fourth data from the first data based on the logical address information of the fourth data and the data length of the fourth data that are carried in the first read request.

Figure 5:
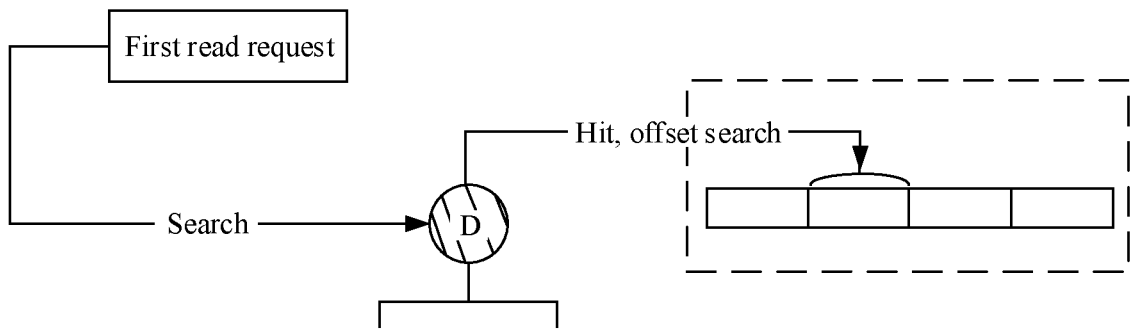
FIG. 5 is a schematic diagram of another scenario of a metadata storage method according to an embodiment of this application.
Figure 6:
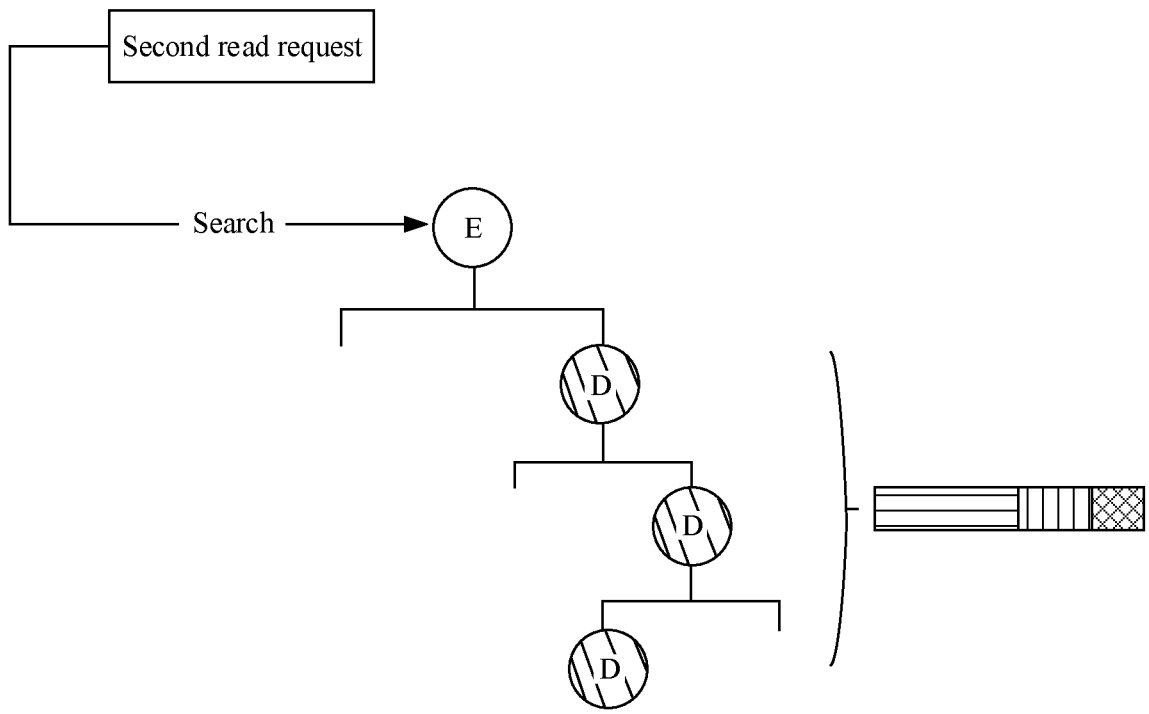
FIG. 6 is a schematic diagram of another scenario of a metadata storage method according to an embodiment of this application.

Specifically, as shown in FIG. 5, the storage device determines the logical address information of the fourth data from the first read request, and determines, based on the logical address information, a sub index tree corresponding to the fourth data. After finding the corresponding sub index tree, the storage device continues to search the sub index tree for a corresponding sub index node. When index information of the fourth data exists in a sub index node of the first sub index node corresponding to the index information of the first data, the storage device extracts the fourth data based on the sub index node of the first sub index node. When reading the corresponding first sub index node, the storage device determines whether the first sub index node has a corresponding sub index node. As shown in FIG. 6, if the corresponding sub index node exists, the storage device also needs to read data corresponding to the sub index node of the first sub index node, and then performs data stitching.

Figure 10:
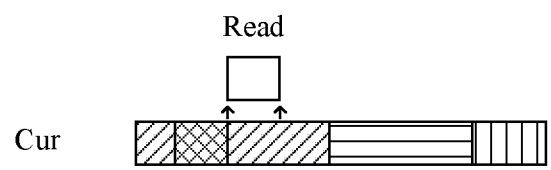
FIG. 10 is a schematic diagram of another scenario of a metadata storage method according to an embodiment of this application.

When the index information of the fourth data does not exist in a sub index node of the first sub index node corresponding to the index information of the first data, as shown in FIG. 10, the storage device obtains index information corresponding to the first sub index node, calculates an offset relative to a logical address of the first sub index node based on the logical address and the data length in the first read request, obtains a physical offset based on the offset relative to the logical address of the first sub index node, and reads a data block corresponding to the fourth data from a data block corresponding to the first data based on the physical offset.

Therefore, when data is read according to this method, read amplification does not exist when data of a small data granularity is read.

In step 208, the storage device obtains a second read request.

The storage device obtains the second read request. The second read request is used to read the second data and the third data. The second data is data that the second write request requests to write, and the third data is data obtained by updating the first data based on the second write request.

In step 209, the storage device searches for the first index node and the second index node based on the second read request.

After obtaining the second read request, the storage device searches for the first index node and the second index node based on the second read request.

Specifically, the storage device determines, based on the logical address information of the second data and the third data in the second read request, sub index trees corresponding to the logical address information of the second data and the third data from the primary index tree. After finding the corresponding sub index trees, the storage device continues to search the sub index trees for sub index nodes corresponding to the third data and the fourth data.

In step 210, the storage device updates the first index node based on the second index node to obtain a third index node.

After finding the first index node and the second index node, the storage device updates the first index node based on the index information in the second index node to obtain the third index node. The third index node is used to query the third data.

Specifically, if the storage device determines that a logical address range corresponding to the index information in the second index node overlaps a logical address range corresponding to the index information in the first index node, the storage device deletes an overlapping part between the logical address range corresponding to the index information in the first index node and the logical address range corresponding to the index information in the second index node, to obtain new index information, and the third index node is an index node obtained after the first index node updates the index information. The new index information corresponds to the third data. During actual application, if the first index node corresponds to the first metadata storage unit, the difference metadata of the metadata of the target data in the first metadata storage unit is deleted. The difference metadata indicates a difference between the metadata of the updated target data and the metadata of the target data, that is, the overlapping part between the logical address range corresponding to the index information in the first index node and the logical address range corresponding to the index information in the second index node.

In step 211, the storage device reads the second data and the third data based on the second index node and the third index node.

After obtaining the third index node, the storage device reads the second data and the third data from the storage device based on the third index node and the second index node.

Specifically, the storage device obtains the corresponding second data from the storage device based on a correspondence between logical address information and physical address information in the index information in the second index node. Likewise, the storage device obtains the corresponding third data from the storage device based on a correspondence between logical address information and physical address information in the index information in the third index node.

During actual application, if same data is repeatedly written, a large quantity of sub index nodes exist in a corresponding sub index tree, increasing index data redundancy. Therefore, the storage device may further perform defragmentation on data corresponding to a sub index tree.

Specifically, the storage device extracts all discontinuous data from the sub index tree to correspondingly write the discontinuous data as complete data. Therefore, a plurality of sub index nodes corresponding to discontinuous data are overwritten by a new sub index node corresponding to one piece of complete data that is written later. This reduces a quantity of sub index nodes in a sub index tree and saves storage resources.

In a possible implementation, when a plurality of second metadata storage units correspond to a large quantity of sub index nodes, and the plurality of second metadata storage units respectively store metadata of different target data, if a superimposed size of the plurality of second metadata storage units is less than or equal to a size of the first metadata storage unit, the metadata in the plurality of second metadata storage units is deleted, and the metadata of the different target data is stored in the first metadata storage unit. In this case, the first metadata storage unit may correspond to the root node, or may correspond to an upper-layer sub index node.

For a defragmentation opportunity, refer to Table 1.

TABLE 1

Defragmentation suggestions

| Read | Write | Whether to perform defragmentation |
|------|-------|-------------------------------------|
| Hot  | Cold  | Strongly suggested                  |
| Cold | Cold  | Suggested                           |
| Hot  | Hot   | Not suggested                       |
| Cold | Hot   | Not suggested                       |

If "read" is "hot", it indicates that data read frequency in the sub index tree is relatively high. If "read" is "cold", it indicates that data read frequency in the sub index tree is relatively low. If "write" is "hot", it indicates that data write frequency in the sub index tree is relatively high. If "write" is "cold", it indicates that data write frequency in the sub index tree is relatively low.

When the sub index tree is in a corresponding state in which "read" is "hot" and "write" is "cold", defragmentation is strongly suggested being performed on the sub index tree. When "read" is "hot" and "write" is "cold", it indicates that corresponding data often needs to be found based on a sub index node, and frequency of generating or updating a sub index node is relatively low. Therefore, if there are excessive sub index nodes, efficiency of searching for data is affected.

When the sub index tree is in a corresponding state in which "read" is "cold" and "write" is "cold", defragmentation is also suggested being performed on the sub index tree. When "read" is "cold" and "write" is "cold", it indicates that frequency of reading data and frequency of writing data are relatively low. Therefore, system resource consumption is low, and corresponding defragmentation may be performed.

When the sub index tree is in a corresponding state in which "read" is "hot" and "write" is "hot", defragmentation is not suggested being performed on the sub index tree. When "read" is "hot" and "write" is "hot", it indicates that data needs to be frequently written, and consequently a sub index node is frequently generated or updated. Therefore, even if defragmentation is complete, more sub index nodes are quickly generated.

When the sub index tree is in a corresponding state in which "read" is "cold" and "write" is "hot", defragmentation is not suggested being performed on the sub index tree either because of the same reason as the state in which "read" is "hot" and "write" is "hot".

During actual application, step 204 to step 211 are optional steps. When step 204 to step 211 are not performed, the storage device receives only the first write request, and generates the sub index tree corresponding to the first write request and the corresponding sub index node.

In this embodiment, there is no sequence of performing steps 204 and 205 and steps 206 and 207. To be specific, the first read request may be obtained before the second write request is received, or the first read request may be obtained after the second write request is received. This is not specifically limited herein.

In this embodiment of this application, the storage device generates the corresponding first index node based on the first data, and the data granularity corresponding to the first index node is greater than the minimum data granularity, so that a plurality of index nodes corresponding to the minimum granularity do not need to be generated correspondingly. This saves storage resources and improves data read/write efficiency.

2. Linear Mode

Figure 7:
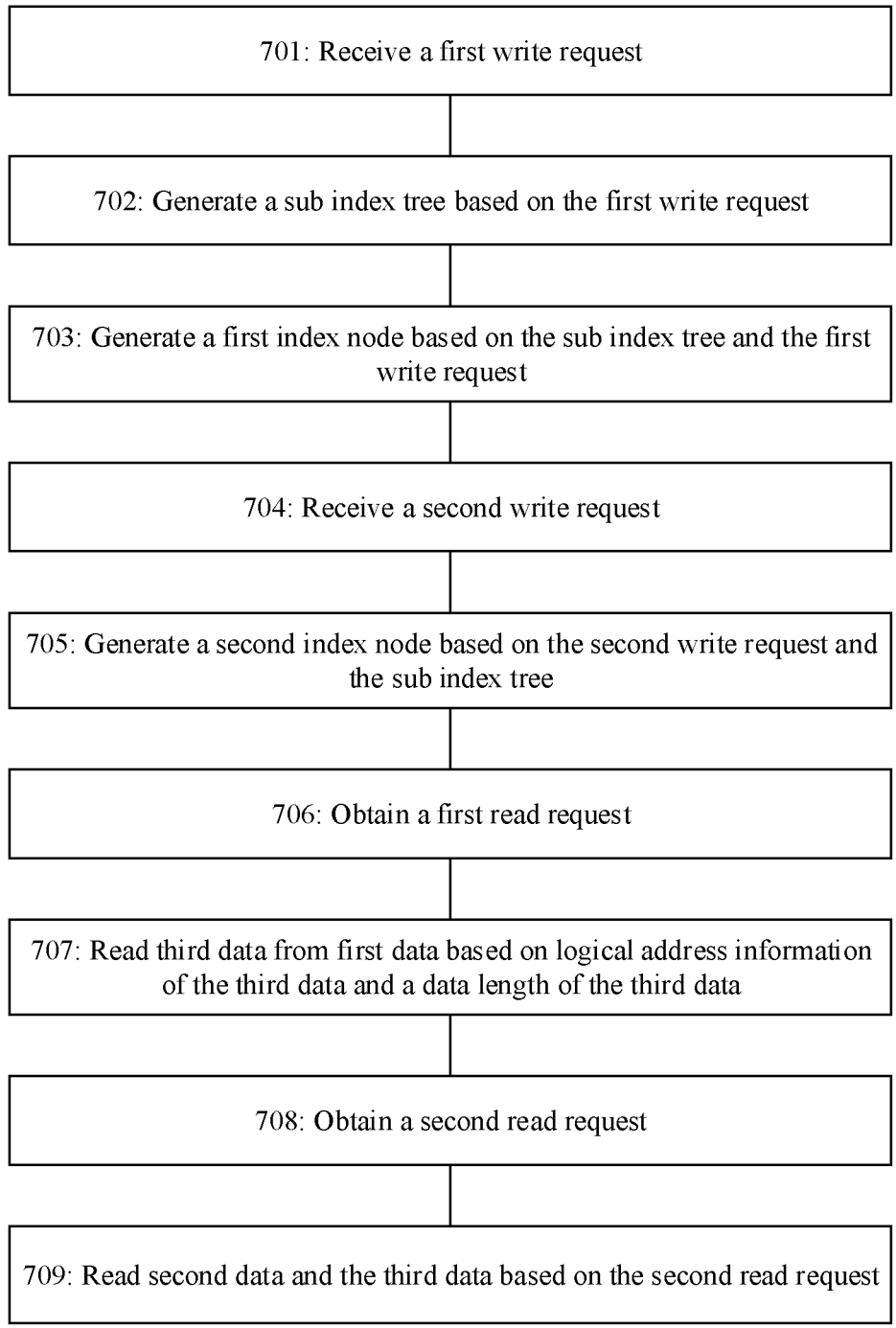
FIG. 7 is another schematic flowchart of a metadata storage method according to an embodiment of this application.

FIG. 7 is another schematic flowchart of a metadata storage method according to an embodiment of this application.

In step 701, a storage device receives a first write request.

In step 702, the storage device generates a sub index tree based on the first write request.

In step 703, the storage device generates a first index node based on the sub index tree and the first write request.

In step 704, the storage device receives a second write request.

Step 701 to step 704 in this embodiment are similar to step 201 to step 204 in the embodiment shown in FIG. 2. Details are not described herein again.

In step 705, the storage device generates a second index node based on the second write request and the sub index tree.

After receiving the second write request, the storage device generates the second index node based on the second write request and the sub index tree. Index information in the second index node is used to query the second data.

Figure 8:
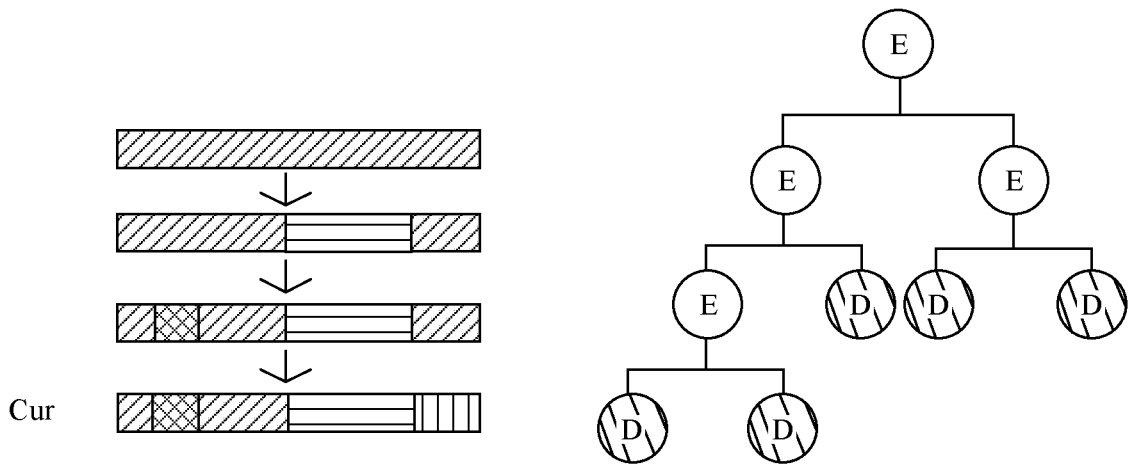
FIG. 8 is a schematic diagram of another scenario of a metadata storage method according to an embodiment of this application.

In a possible implementation, when the second data is data obtained by modifying the first data, and a data length of the second data is less than the data length of the first data, the storage device generates the second index node based on related information carried in the second write request, the index information recorded in the sub index tree, and the first index node. The second index node is a child node of the first index node. As shown in FIG. 8, a left bar in FIG. 8 records index information corresponding to a root node in a sub index tree, and different grids in the bar indicate different index information corresponding to different modified data, and from top to bottom, indicate metadata written into the root node for the first time to metadata written into the root node for the last time. In other words, each time metadata is written, original metadata is directly modified.

Specifically, in a possible implementation, logical address information of the second data carried in the second write request indicates to write the second data into the sub index tree in which the first data is located. In addition, the data length of the second data is less than the data length of the first data. In other words, it indicates that the second data is data obtained by modifying the first data. As shown in a right sub index tree in FIG. 8, the storage device updates the first index node corresponding to the first data to obtain a third index node. Specifically, the first index node is split into two lower-layer sub index nodes, namely, the second index node and the third index node. The second index node corresponds to the second data, and the third index node corresponds to unmodified data in the first data. During actual application, the first data is the target data, the second data is updated target data, the specified threshold is the data granularity corresponding to the first data, and difference metadata indicates index information corresponding to data obtained by modifying the first data. In this case, if a size of the updated target data is less than the specified threshold, the difference metadata is stored in the second metadata storage unit, and the second metadata storage unit is the second index node.

It should be noted that, in the linear mode, metadata may be written by using a left linked list in FIG. 8, or metadata may be written by using a right binary tree mode in FIG. 8. It may be understood that, during actual application, metadata may be written in another manner, for example, by using an array. This is not specifically limited herein.

In a possible implementation, when the data length of the second data is greater than or equal to the data length of the first data, it indicates that the second data covers the first data. The storage device determines, by using the logical address information of the second data and the found sub index tree corresponding to the logical address information of the second data, that the second data is data obtained by modifying the first data. After finding the corresponding first index node, the storage device deletes the first index node.

When the data length of the second data is equal to the data length of the first data, the storage device generates the second index node at the same location as the first index node, or the storage device generates the second index node at a location parallel to the first index node. This is not specifically limited herein.

When the data length of the second data is greater than the data length of the first data, the storage device generates the second index node at a location of a parent node of the first index node. In a possible implementation, a location at which the second index node is generated may be determined based on the data length of the second data. For example, when the sub index tree starts from the root node, each time the sub index tree is decreased by one layer, it indicates that a data granularity is decreased by half, and a layer height of the sub index tree is $\log_2$ (Maximum data granularity/Minimum data granularity). When the data length of the first data is one quarter of the data granularity of the root node, the index node corresponding to the first data is located at a layer lower than that of the root node by two layers. When the data length of the second data is greater than the data length of the first data and less than twice the data length of the first data, a second sub index node is generated at the second layer of the sub index tree, that is, a location of a parent node of a first sub index node. When the data length of the second data is greater than twice the data length of the first data, the index information of the second data is written into the root node. In this case, the second sub index node is the root node. During actual application, the first data is the target data, the second data is the updated target data, the specified threshold is the data granularity corresponding to the first data, the first metadata storage unit is a root node, and the second metadata storage unit is a sub index node. In this case, if the size of the updated target data is greater than the specified threshold, the metadata of the target data in the second metadata storage unit is deleted, and metadata of the updated target data is stored in the first metadata storage unit.

Figure 9:
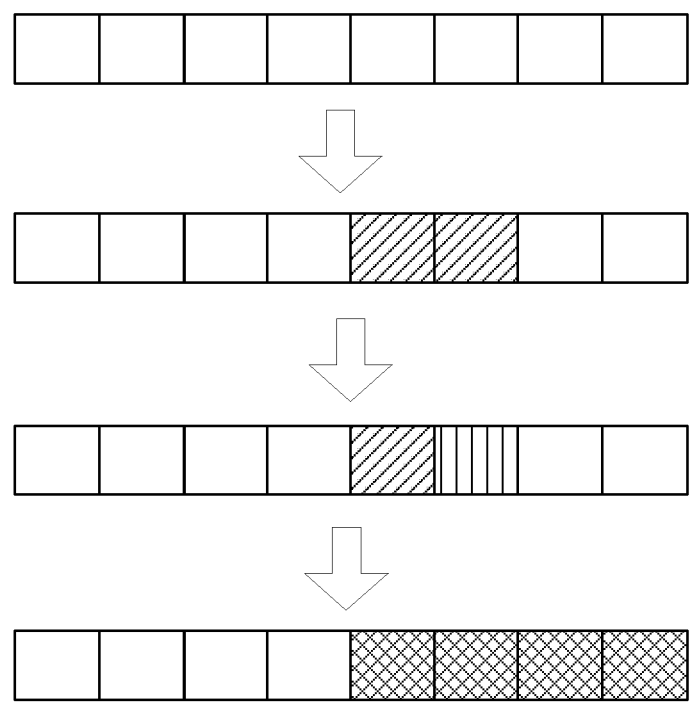
FIG. 9 is a schematic diagram of another scenario of a metadata storage method according to an embodiment of this application.

For example, FIG. 9 shows a procedure of writing index information corresponding to data in the linear mode. In FIG. 9, a top-layer bar indicates blank metadata, the blank metadata corresponds to one sub index tree, and a small bar of a data granularity corresponds to one sub index node. When one first write request is received, metadata of two data granularities in the metadata is updated to metadata corresponding to the first write request. When one second write request is received, and a data length of data that the second write request requests to write is less than a data length of data that a first write request requests to write, one data granularity of metadata of two data granularities is updated to metadata corresponding to the second write request. When one second write request is received, and a data length of data that the second write request requests to write is greater than or equal to a data length of data that a first write request requests to write, metadata of previous two data granularities is overwritten with metadata corresponding to second data carried in the second write request. In this case, the overwritten metadata corresponds to a second index node.

Correspondingly, after obtaining the second index node, the storage device updates, based on the second write request, the first data stored in the storage device, to obtain third data.

In step 706, the storage device obtains a first read request.

In step 707, the storage device reads the third data from the first data based on logical address information of the third data and a data length of the third data.

In step 708, the storage device obtains a second read request.

Step 706 to step 708 in this embodiment are similar to step 206 to step 208 in the embodiment shown in FIG. 2. Details are not described herein again.

In step 709, the storage device reads the second data and the third data based on the second read request.

After obtaining the second read request, the storage device searches for the first index node and the second index node based on the second read request.

Specifically, the storage device determines, based on the logical address information of the second data and the third data in the second read request, sub index trees corresponding to the logical address information of the second data and the third data from the primary index tree. After finding the corresponding sub index trees, the storage device continues to search the sub index trees for the second sub index node and a third sub index node corresponding to the second data and the third data.

The storage device reads the second data and the third data from the storage device based on the third index node and the second index node.

Specifically, the storage device obtains the corresponding second data from the storage device based on a correspondence between logical address information and physical address information in the index information in the second index node. Likewise, the storage device obtains the corresponding third data from the storage device based on a correspondence between logical address information and physical address information in the index information in the third index node.

During actual application, if same data is repeatedly written, a large quantity of sub index nodes exist in a corresponding sub index tree, increasing index data redundancy. Therefore, the storage device may further perform defragmentation on data corresponding to a sub index tree.

Figure 11:
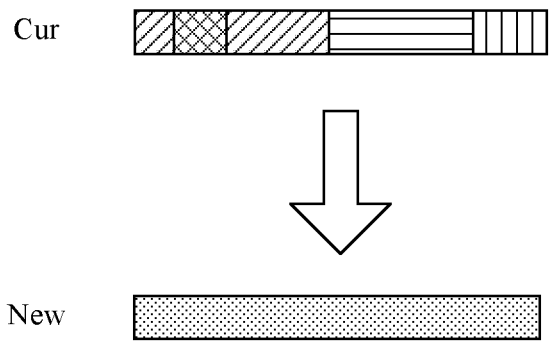
FIG. 11 is a schematic diagram of another scenario of a metadata storage method according to an embodiment of this application.

Specifically, as shown in FIG. 11, the storage device extracts all discontinuous data from the sub index tree to correspondingly write the discontinuous data as complete data. Therefore, a plurality of sub index nodes corresponding to discontinuous data are overwritten by a new sub index node corresponding to one piece of complete data that is written later. This reduces a quantity of sub index nodes in a sub index tree and saves storage resources.

In a possible implementation, when a plurality of second metadata storage units correspond to a large quantity of sub index nodes, and the plurality of second metadata storage units respectively store metadata of different target data, if a superimposed size of the plurality of second metadata storage units is less than or equal to a size of the first metadata storage unit, the metadata in the plurality of second metadata storage units is deleted, and the metadata of the different target data is stored in the first metadata storage unit. In this case, the first metadata storage unit may correspond to the root node, or may correspond to an upper-layer sub index node.

For a defragmentation opportunity, refer to Table 1.

TABLE 1

Defragmentation suggestions

| Read | Write | Whether to perform defragmentation |
|------|-------|-----------------------------------|
| Hot  | Cold  | Strongly suggested                |
| Cold | Cold  | Suggested                         |
| Hot  | Hot   | Not suggested                     |
| Cold | Hot   | Not suggested                     |

If "read" is "hot", it indicates that data read frequency in the sub index tree is relatively high. If "read" is "cold", it indicates that data read frequency in the sub index tree is relatively low. If "write" is "hot", it indicates that data write frequency in the sub index tree is relatively high. If "write" is "cold", it indicates that data write frequency in the sub index tree is relatively low.

When the sub index tree is in a corresponding state in which "read" is "hot" and "write" is "cold", defragmentation is strongly suggested being performed on the sub index tree. When "read" is "hot" and "write" is "cold", it indicates that corresponding data often needs to be found based on a sub index node, and frequency of generating or updating a sub index node is relatively low. Therefore, if there are excess sub index nodes, efficiency of searching for data is affected.

When the sub index tree is in a corresponding state in which "read" is "cold" and "write" is "cold", defragmentation is also suggested being performed on the sub index tree. When "read" is "cold" and "write" is "cold", it indicates that frequency of reading data and frequency of writing data are relatively low. Therefore, system resource consumption is low, and corresponding defragmentation may be performed.

When the sub index tree is in a corresponding state in which "read" is "hot" and "write" is "hot", defragmentation is not suggested being performed on the sub index tree. When "read" is "hot" and "write" is "hot", it indicates that data needs to be frequently written, and consequently a sub index node is frequently generated or updated. Therefore, even if defragmentation is complete, more sub index nodes are quickly generated.

When the sub index tree is in a corresponding state in which "read" is "cold" and "write" is "hot", defragmentation is not suggested being performed on the sub index tree either because of the same reason as the state in which "read" is "hot" and "write" is "hot".

During actual application, step 704 to step 709 are optional steps. When step 704 to step 709 are not performed, the storage device receives only the first write request, and generates the sub index tree corresponding to the first write request and the corresponding sub index node.

In this embodiment, there is no sequence of performing steps 704 and 705 and steps 706 and 707. To be specific, the first read request may be obtained before the second write request is received, or the first read request may be obtained after the second write request is received. This is not specifically limited herein.

In this embodiment, the storage device accesses corresponding metadata according to the linear mode. This reduces metadata redundancy and saves storage resources.

The foregoing describes the metadata storage methods in embodiments of this application, and the following describes storage devices in embodiments of this application.

Figure 12:
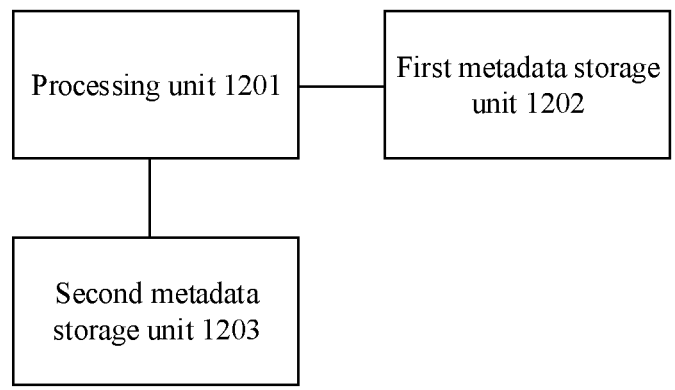
FIG. 12 is a schematic diagram of a structure of a storage device according to an embodiment of this application.

FIG. 12 is a schematic diagram of a structure of a storage device according to an embodiment of this application.

The storage device includes:

a first metadata storage unit 1202 and a second metadata storage unit 1203, where a size of the first metadata storage unit 1202 is greater than a size of the second metadata storage unit 1203; and a processing unit 1201, configured to: when a size of target data reaches a specified threshold, store metadata of the target data based on the first metadata storage unit 1202; or when the size of the target data is less than the specified threshold, store the metadata of the target data based on the second metadata storage unit 1203.

In this embodiment, operations performed by the units in the storage device are similar to those described in embodiments shown in FIG. 2 and FIG. 7. Details are not described herein again.

Figure 13:
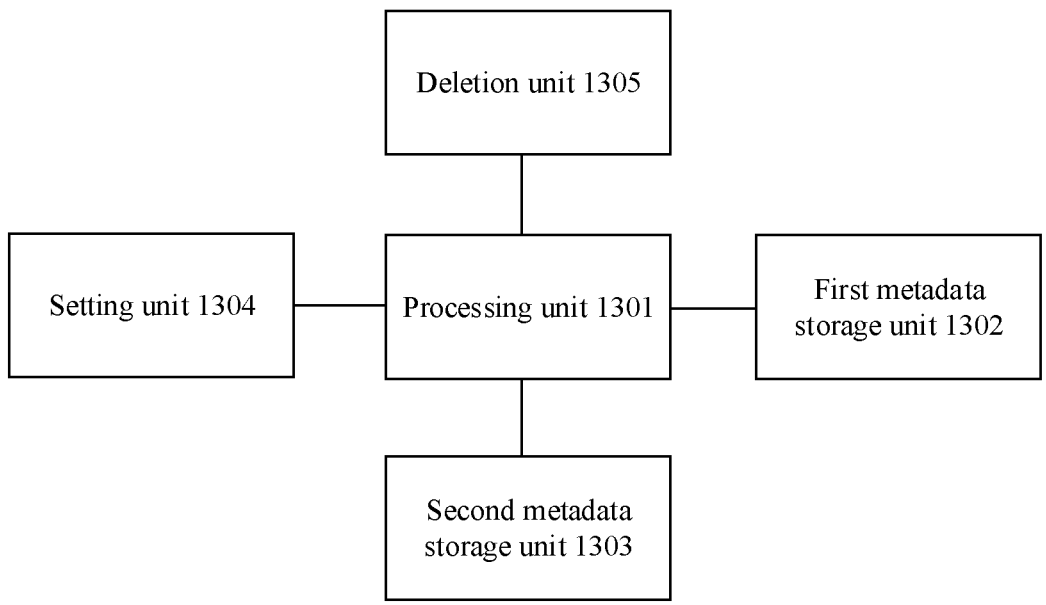
FIG. 13 is a schematic diagram of another structure of a storage device according to an embodiment of this application.

FIG. 13 is a schematic diagram of another structure of a storage device according to an embodiment of this application.

The storage device includes:

a first metadata storage unit 1302 and a second metadata storage unit 1303, where a size of the first metadata storage unit 1302 is greater than a size of the second metadata storage unit 1303; and a processing unit 1301, configured to: when a size of target data reaches a specified threshold, store metadata of the target data based on the first metadata storage unit 1302; or when the size of the target data is less than the specified threshold, store the metadata of the target data based on the second metadata storage unit 1303.

Optionally, the storage device further includes:

a setting unit 1304, configured to set a maximum value and a minimum value of a size of a metadata storage unit, where the size of the first metadata storage unit 1302 is between the minimum value and the maximum value, and the size of the second metadata storage unit 1303 is between the minimum value and the maximum value.

Optionally, when the size of the target data is less than the specified threshold, the storage device further includes a deletion unit 1305.

The deletion unit 1305 is configured to: when the size of the target data is updated to be greater than the specified threshold, delete the metadata of the target data in the second data storage unit 1303.

The processing unit 1301 is further configured to store metadata of updated target data in the first metadata storage unit 1302.

Optionally, when the size of the target data is greater than the specified threshold, the storage device further includes a deletion unit 1305.

The deletion unit 1305 is further configured to: when the size of the target data is updated to be less than the specified threshold, delete difference metadata of the metadata of the target data in the first data storage unit 1302. The difference metadata indicates a difference between metadata of updated target data and the metadata of the target data.

The processing unit 1301 is further configured to store the difference metadata in the second metadata storage unit 1303.

Optionally, when there are a plurality of second metadata storage units 1303, the plurality of second metadata storage units 1303 respectively store metadata of different target data, and a superimposed size of the plurality of second metadata storage units 1303 is less than or equal to the size of the first metadata storage unit 1302, the deletion unit 1305 is further configured to delete the metadata in the plurality of second metadata storage units 1303.

The processing unit 1301 is further configured to store the metadata of the different target data in the first metadata storage unit 1302.

In this embodiment, operations performed by the units in the storage device are similar to those described in embodiments shown in FIG. 2 and FIG. 7. Details are not described herein again.

An embodiment of this application further provides a computer-readable storage medium. The computer-readable storage medium stores a computer program. The computer program is executed by a computer, to implement the method procedure performed by the storage device in any one of the foregoing method embodiments. Correspondingly, the computer may be the foregoing storage device.

It should be understood that the controller or the processor mentioned in embodiments of this application may be a central processing unit (central processing unit, CPU), or may be a combination of one or more of another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, and the like. The general-purpose processor may be a microprocessor, or the processor may be any conventional processor, or the like.

It should be further understood that there may be one or more processors or controllers in the storage device in embodiments of this application, which may be adjusted based on an actual application scenario. This is merely an example for description herein, and does not constitute a limitation. There may be one or more memories in embodiments of this application, which may be adjusted based on an actual application scenario. This is merely an example for description herein, and does not constitute a limitation.

It should be further understood that the memory, the readable storage medium, or the like in the storage device or the like mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

Persons of ordinary skill in the art may understand that all or some of the steps performed by the storage device or the processor in embodiments may be implemented by hardware or a program instructing related hardware. The program may be stored in a computer-readable storage medium. The storage medium mentioned above may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether these functions are performed by hardware or software depends on particular applications and design constraints of the technical solutions. Persons skilled in the art may use different methods to implement the described functions for each particular application, but it should not be considered that the implementation goes beyond the scope of this application.

When the software is used for implementation, all or some of the method steps in embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like.

In this specification, the claims, and the accompanying drawings of this application, terms "first", "second", and the like are intended to distinguish between similar objects but do not necessarily indicate a specific order or sequence. It should be understood that the terms used in such a way are interchangeable in proper circumstances, and this is merely a distinguishing manner for describing objects having a same attribute in embodiments of this application. In addition, terms "include", "have", and any other variants mean to cover the non-exclusive inclusion, so that a process, method, system, product, or device that includes a series of units is not necessarily limited to those units, but may include other units not expressly listed or inherent to such a process, method, product, or device.

The terms used in embodiments of this application are merely for the purpose of illustrating specific embodiments, and are not intended to limit the present invention. Terms "a", "the", and "this" of singular forms used in embodiments of this application are also intended to include plural forms, unless otherwise specified in a context clearly. It should be further understood that, in the descriptions of this application, "/" represents an "or" relationship between associated objects, unless otherwise specified. For example, A/B may represent A or B. A term "and/or" in this application is merely an association relationship between associated objects, and represents that three relationships may exist. For example, A and/or B may represent the following three cases: Only A exists, both A and B exist, and only B exists, where A and B each may be singular or plural.

Depending on the context, for example, words "if" or "assuming that" used herein may be explained as "while" or "when" or "in response to determining" or "in response to detecting". Similarly, according to the context, a phrase "if it is determined that" or "if (a stated condition or event) is detected" may be interpreted as a meaning of "when it is determined that", "in response to determining", "when (a stated condition or event) is detected", or "in response to detecting (a stated condition or event)".

In conclusion, embodiments are merely intended for describing the technical solutions of this application, but not for limiting this application. Although this application is described in detail with reference to embodiments, persons of ordinary skill in the art should understand that they may still make modifications to the technical solutions described in embodiments or make equivalent replacements to some technical features thereof, without departing from the scope of the technical solutions of embodiments of this application.

What is claimed is:

1. A method performed by a storage device for writing to and reading from a physical storage space, comprising:
providing a multiple-granularity index tree having a root index node on a top level and multiple sub-levels of index nodes, wherein the top level corresponds to a highest granularity of data, the multiple sub-levels correspond to decreasing granularities, and each index node in each sub-level contains index metadata for mapping to a portion of the physical storage space matching a granularly of said each sub-level;
receiving a first write request, the write request containing target data to be stored in the physical storage space;
identifying a first sub-level in the multiple-granularity index tree that has a granularity corresponding to a size of the target data, wherein a second sub-level immediately above the first sub-level has a granularity greater than the size of the target data;
identifying, in the first sub-level, a first index node that corresponds to physical storage space to be used for storing the target data;
retrieving index metadata from the first index node, and writing the target data to a target location of the physical storage space according to the index metadata retrieved from the first index node.

2. The method according to claim 1, wherein the step of providing the multiple-granularity index tree comprises:
constructing the multiple-granularity index tree based on previously received write requests for writing data into the physical storage space.

3. The method according to claim 2, further comprising:
receiving a second write request, the second write request including an update of the target data and the update having a size greater than a granularity of a second sub-level above the first sub-level;
deleting the index metadata of the target data in the first index node; and
storing index metadata of updated target data in a second index node in the second sub-level.

4. The method according to claim 1, further comprising:
performing defragmentation on the multiple-granularity index tree.

5. A storage device comprising:
a memory for storing metadata; and
a processor configured to:
provide a multiple-granularity index tree having a root index node on a top level and multiple sub-levels of index nodes, wherein the top level corresponds to a highest granularity of data, the multiple sub-levels correspond to decreasing granularities, and each index node in each sub-level contains index metadata for mapping to a portion of a physical storage space matching a granularly of said each sub-level;
receive a first write request, the write request containing target data to be stored;
identify a first sub-level in the multiple-granularity index tree that has a granularity corresponding to a size of the target data, wherein a second sub-level immediately above the first sub-level has a granularity greater than the size of the target data;
identify, in the first sub-level, a first index node that corresponds to physical storage space to be used for storing the target data;
retrieve index metadata from the first index node, and write the target data to a target location of the physical storage space according to the index metadata retrieved from the first index node.

6. The storage device according to claim 5, wherein the processor is configured to provide the multiple-granularity index tree by:
constructing the multiple-granularity index tree based on previously received write requests for writing data into the physical storage space.

7. The storage device according to claim 5, wherein the processor is further configured to:
receive a second write request, the second write request including an update of the target data and the update having a size greater than a granularity of a second sub-level above the first sub-level;
delete the index metadata of the target data in the first index node; and
store index metadata of updated target data in a second index node in the second sub-level.

8. The storage device according to claim 5, wherein the processor is further configured to:
perform defragmentation on the multiple-granularity index tree.

9. A non-transitory computer-readable medium having stored therein instructions that when executed by a processor of a storage device cause the storage device to perform operations comprising:
providing a multiple-granularity index tree having a root index node on a top level and multiple sub-levels of index nodes, wherein the top level corresponds to a highest granularity of data, the multiple sub-levels correspond to decreasing granularities, and each index node in each sub-level contains index metadata for mapping to a portion of the physical storage space matching a granularly of said each sub-level;
receiving a write request, the write request containing target data to be stored;
identifying a first sub-level in the multiple-granularity index tree that has a granularity corresponding to a size of the target data, wherein a second sub-level immediately above the first sub-level has a granularity greater than the size of the target data;
identifying, in the first sub-level, a first index node that corresponds to physical storage space to be used for storing the target data; and
retrieving index metadata from the first index node, and writing the target data to a target location of the physical storage space according to the index metadata retrieved from the first index node.

10. A non-transitory computer-readable medium according to claim 9, wherein the instructions cause the storage device to provide the multiple-granularity index tree by:
constructing the multiple-granularity index tree based on previously received write requests for writing data into the physical storage space.

11. A non-transitory computer-readable medium according to claim 9, wherein the instructions further cause the storage device to perform operations of:
receiving a second write request, the second write request including an update of the target data and the update having a size greater than a granularity of a second sub-level above the first sub-level;
deleting the index metadata of the target data in the first index node; and
storing index metadata of updated target data in a second index node in the second sub-level.

12. A non-transitory computer-readable medium according to claim 9, wherein the instructions further cause the storage device to perform an operation of:
performing defragmentation on the multiple-granularity index tree.

* * * * *